United States Patent
Tallet (10) Patent No.: US 8,248,920 B2
(45) Date of Patent: Aug. 21, 2012

(54) ALTERNATE SPANNING TREE FOR FASTER INDIRECT LINK FAILURE RECOVERY

(75) Inventor: Francois Tallet, Santa Clara, CA (US)

(73) Assignee: CISCO TECHNOLOGY, Inc., San Jose, CA (US)

( * ) Notice: Subject to any disclaimer, the term of this patent is extended or adjusted under 35 U.S.C. 154(b) by 815 days.

(21) Appl. No.: 11/459,787

(22) Filed: Jul. 25, 2006

(65) Prior Publication Data

US 2008/0025203 A1    Jan. 31, 2008

(51) Int. Cl.
*H04L 12/26* (2006.01)
(52) U.S. Cl. ......................................................... 370/222
(58) Field of Classification Search .................. None
See application file for complete search history.

(56) References Cited

U.S. PATENT DOCUMENTS

| | | | |
|---|---|---|---|
| 6,219,739 B1 * | 4/2001 | Dutt et al. ..................... | 710/311 |
| 6,304,575 B1 * | 10/2001 | Carroll et al. ................. | 370/408 |
| 6,330,229 B1 * | 12/2001 | Jain et al. ...................... | 370/256 |
| 6,407,985 B1 * | 6/2002 | Jain .............................. | 370/256 |
| 6,515,969 B1 * | 2/2003 | Smith ........................... | 370/256 |
| 6,628,624 B1 * | 9/2003 | Mahajan et al. .............. | 370/256 |
| 6,717,922 B2 * | 4/2004 | Hsu et al. ...................... | 370/258 |
| 6,766,482 B1 * | 7/2004 | Yip et al. ....................... | 714/717 |
| 6,801,506 B1 * | 10/2004 | Dey ............................... | 370/256 |
| 7,061,875 B1 * | 6/2006 | Portolani et al. .............. | 370/256 |
| 7,177,946 B1 * | 2/2007 | Kaluve et al. ................. | 370/256 |
| 7,564,858 B1 * | 7/2009 | Moncada-Elias et al. ..... | 370/402 |
| 7,720,011 B1 * | 5/2010 | Thottakkara ................... | 370/256 |
| 7,778,205 B2 | 8/2010 | Florit et al. | |
| 7,822,049 B1 * | 10/2010 | Moncada-Elias et al. ..... | 370/256 |
| 2001/0021177 A1 * | 9/2001 | Ishii .............................. | 370/256 |
| 2002/0147800 A1 * | 10/2002 | Gai et al. ...................... | 709/221 |
| 2002/0176373 A1 * | 11/2002 | Sato .............................. | 370/254 |
| 2002/0181412 A1 * | 12/2002 | Shibasaki ...................... | 370/256 |
| 2004/0017770 A1 * | 1/2004 | Higashiyama et al. ........ | 370/223 |
| 2004/0081083 A1 * | 4/2004 | Sekihata ........................ | 370/222 |
| 2005/0207348 A1 * | 9/2005 | Tsurumi et al. ............... | 370/241 |
| 2005/0220036 A1 * | 10/2005 | Sugitani et al. ............... | 370/252 |
| 2005/0249123 A1 * | 11/2005 | Finn .............................. | 370/242 |
| 2005/0259597 A1 * | 11/2005 | Benedetto et al. ............ | 370/254 |
| 2006/0007939 A1 * | 1/2006 | Elangovan ................ | 370/395.53 |
| 2006/0083255 A1 * | 4/2006 | Rouyer et al. ................. | 370/402 |
| 2006/0146845 A1 * | 7/2006 | Rose ............................. | 370/402 |
| 2006/0198323 A1 * | 9/2006 | Finn .............................. | 370/256 |
| 2006/0245376 A1 * | 11/2006 | Ge et al. ........................ | 370/256 |
| 2007/0002770 A1 * | 1/2007 | Haalen et al. ................. | 370/256 |
| 2007/0008964 A1 * | 1/2007 | Rose et al. .................... | 370/389 |
| 2007/0159987 A1 * | 7/2007 | Khan et al. .................... | 370/256 |
| 2007/0159988 A1 * | 7/2007 | Khan et al. .................... | 370/256 |
| 2007/0189154 A1 * | 8/2007 | Hourtane et al. .............. | 370/218 |

* cited by examiner

*Primary Examiner* — Timothy J Weidner
(74) *Attorney, Agent, or Firm* — Patterson & Sheridan, LLP (57) ABSTRACT

Methods and apparatus that form the basis of an alternate spanning tree protocol that may be used, for example, to identify rings within a properly converged network configured by the spanning tree protocol (STP) or rapid spanning tree protocol (RSTP) are provided. With the knowledge of these rings, the alternate spanning tree has predetermined an alternate port that can restore connectivity without further computation in case of a link failure, thereby providing for extremely fast reconvergence.

19 Claims, 8 Drawing Sheets

○ = ROOT PORT
/ = ALTERNATE PORT

○ = ROOT PORT
╱ = ALTERNATE PORT

○ = ROOT PORT
/ = ALTERNATE PORT

FIG. 3C

○ = ROOT PORT
╱ = ALTERNATE PORT

ALTERNATE SPANNING TREE FOR FASTER INDIRECT LINK FAILURE RECOVERY

BACKGROUND OF THE INVENTION

1. Field of the Invention

Embodiments of the present invention generally relate to the field of network configuration and, more particularly, to recovery from a failed link configured with the Spanning Tree Protocol (STP).

2. Description of the Related Art

Larger local area networks (LANs) comprise multiple sections, where each section may be used by a particular workgroup or department. These LANs may be divided in this manner for security purposes and to improve traffic flow by filtering out data packets that are not destined for a particular section. Called network segments, these sections may be separated from the rest of the LAN by a network bridge, sometimes called a network switch in marketing literature.

A single network bridge is typically a computer with multiple ports used to connect multiple network segments together. The bridging function includes receiving data from a port and transferring that data to other ports for receipt by other network entities. Network bridges operate along the data link layer, also known as layer 2 in the Open System Interconnection (OSI) Reference Model. Since bridging decisions are based solely on end-station MAC addresses, which are contained within the data frame, network bridges are able to move such data frames rapidly from one port to another.

Interconnecting all of the network bridges could be as simple as daisy-chaining one bridge to the next in series, but sound network design typically advocates providing redundant links to offer an alternative path should a link fail. However, if a network had more than one path to a destination activated, then this might create a loop, and the network bridges could endlessly broadcast data frames. This situation is called a broadcast storm, and it can cripple a network. In addition, network bridge loops can cause the bridges to misinterpret results.

To prevent loops in bridged networks, the Spanning Tree Protocol (STP) according to IEEE 802.1D is often used. The structure of STP corresponds to that of the spanning tree in graph theory where a connected, undirected graph has a subgraph akin to a tree spanning the entire graph and connecting all of the vertices together. Several different spanning trees can be associated with a single graph. Since a weight can be assigned to each edge of a graph and a spanning tree can be assigned a weight equal to the sum of the weights of the edges within this spanning tree, a minimum spanning tree can be determined which possesses a weight less than or equal to the weight of every other spanning tree for that particular graph. In bridged networks, the minimum spanning tree algorithm dynamically determines the best path from source to destination and ensures that only one path is active at any one time by detecting loops and blocking network bridge ports as required.

A root exists at the base of every tree, and following the guidelines of STP, the spanning tree is no different. The spanning tree algorithm automatically selects a root bridge according to a set of rules that ensure only a single bridge is elected as the root bridge for a given network. Each bridge has a media access control (MAC) address and a configurable priority number, which compose the bridge identification (BID). The root bridge is elected based on the lowest (the best) priority number using the BID. If a tie occurs, then the MAC address is used to break the tie with the bridge with the lowest MAC address out of the group with the lowest priority number prevailing. Since no two MAC addresses are the same, one network bridge will always be successfully selected as the root bridge. Other bridges can subsequently calculate the shortest distance to the root bridge using bandwidth as a weighting metric and so produce a loop free topology. Even though the priority number is normally left at its default value, it can be reconfigured to a lower number if the network administrator wants to force a particular bridge to be elected as the root bridge. Otherwise, the entire process is completely automated.

To aid in this process and enable communication between the network bridges, BIDs and other STP information are carried in special data frames called bridge protocol data units (BPDUs). Regularly exchanged at 2 second intervals, BPDUs allow bridges to keep track of network changes and activate or disable ports as required. When a new device is first connected to a bridge port, the port will not immediately start to forward data. Instead, the port will run through a number of states while it processes BPDUs and determines the topology of the network. When this device is a host (e.g. client computer, printer, or server), the port will always go into forwarding mode—the normal operating mode where the port is receiving and sending data—although after a delay of about 30 seconds while the port goes through the listening and learning modes. Of course, if the new device connected to the port is another bridge, the port may remain in blocking mode if activating the port would cause a loop in the network.

Since a delay of 50 seconds is unacceptable by conventional standards, Rapid Scanning Tree Protocol (RSTP) was developed as an evolution of STP and was standardized by IEEE 802.1w. RSTP provides for faster spanning tree convergence after a topology change, allowing a bridge port to enter forwarding mode immediately upon the attachment of an end device. Since the 2004 edition of IEEE 802.1d, STP has been superseded by RSTP. In RSTP, there are only three port states: discarding, learning and forwarding. STP's disabled, blocking, and listening states have been combined into RSTP's discarding state. Also according to RSTP, the port role is now a variable assigned to a given port with STP's blocking port role being split into backup and alternate port roles and leaving the root and designated ports. The spanning tree algorithm determines the role of a port based on BPDUs as described above and further explained below.

Figure 1A:
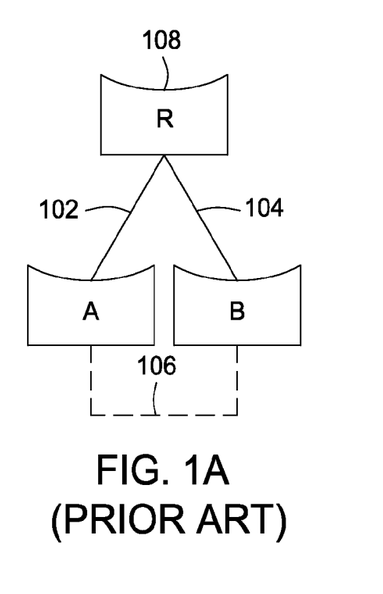
FIG. 1A is a prior art block diagram of three network bridges showing how they may be connected.

Considering a simple network with only three network bridges labeled A, B, and R as shown in FIG. 1a, only two links 102, 104 are required to connect all the bridges together. A third link 106 may be provided for redundancy in case of a link failure, but one of the ports should be blocked to prevent a loop topology according to STP/RSTP. A root bridge 108 is selected based on sending the lowest priority number BPDUs, lower (better) than any other bridge can send. For a particular bridge, the port that is closest to the root bridge in terms of path cost (i.e. receives the best BPDU) is designated as a root port.

Figure 1B:
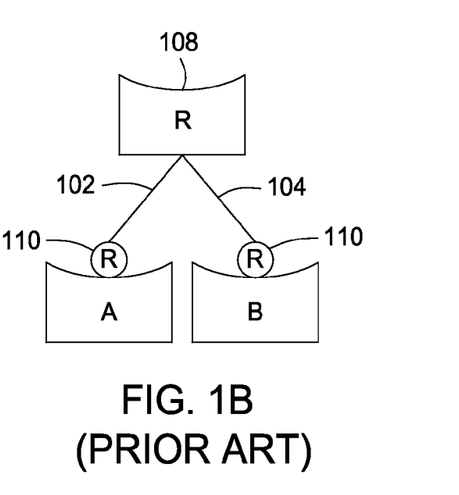
FIG. 1B is a prior art block diagram of three network bridges showing the root ports.

Two root ports 110 are shown in FIG. 1b. The root bridge 108 is the only bridge in the network that does not have a root port. Regarding FIG. 1c, a port assumes a designated port role if it can send the best BPDU on the network segment to which it is connected. For a given segment, there can only be one path toward the root bridge 108. If there were two, a loop would exist, which is undesirable, as described above.

Figure 1C:
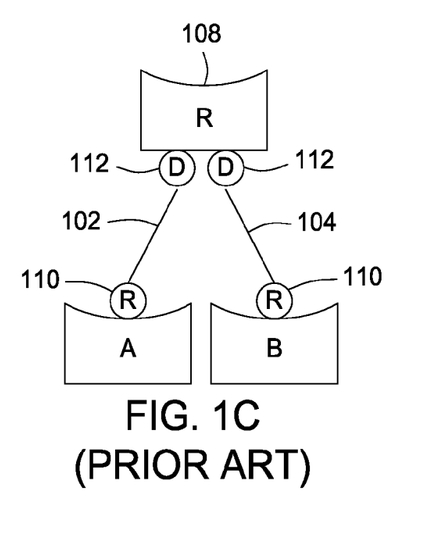
FIG. 1C is a prior art block diagram of three network bridges showing the root ports and the designated ports.

All bridges connected to a given segment listen to each other's BPDUs and agree on the bridge sending the best BPDU as the designated bridge for the segment. The corresponding port on the designated bridge is a designated port 112. In order to leave the third link 106 connected in the network in case of a link failure in the other two links 102, 104, one of the ports of bridge A or bridge B must be blocked. A blocked port receives a better priority number BPDU than the one it would send out on its segment.

Figure 1D:
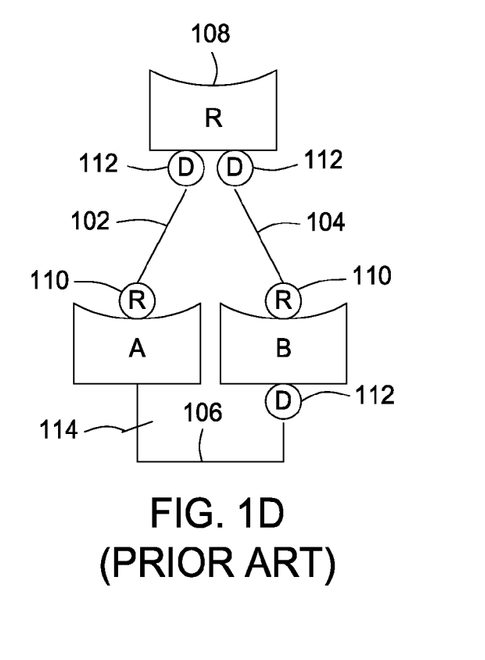
FIG. 1D is a prior art block diagram of three network bridges showing the root ports, the designated ports, and an alternate port on a redundant link.

When the ends of a network segment reside on different bridges, as shown in FIG. 1d, the blocked port is termed an alternate port 114. When the two ends reside on the same bridge, the blocked port is called a backup port (not shown). Note that the port on the other end of a segment with an alternate port 114 becomes a designated port 112.

In the event of a link failure between any of the bridges, the network may be reconfigured such that a blocked port may be enabled, thereby allowing the use of alternate paths. While a very simple network of three bridges is shown in FIGS. 1a-1d, much larger networks in a ring topology are commonplace. In such networks, in the event of an indirect link failure (a failure that is not detected by a bridge hosting an alternate port), substantial time may be required because the spanning tree would have to rediscover the topology before restoring the connectivity.

Accordingly, what is needed is a method to speed recovery in the event of a link failure, for example, in an effort to achieve a fast reconvergence time with minimal impact on network performance.

SUMMARY OF THE INVENTION

One embodiment of the present invention provides a method of recovering from a communications link failure in a network comprising one or more bridge devices and configured as a spanning tree having a root bridge device and an alternate port associated with the root bridge device and capable of restoring connectivity to the root bridge device in the event of the link failure. The method generally includes automatically identifying a ring containing the root bridge device and the alternate port, notifying the one or more bridge devices within the ring of the alternate port, sending a pre-computed message to a bridge device having the alternate port, and unblocking the alternate port based on the message.

Another embodiment of the present invention provides a method of configuring a network comprising one or more bridge devices. The method generally includes creating a first level of bridge communication configured to flow in a first direction, selecting a root bridge device based on information contained in the first level of bridge communication, and creating a second level of bridge communication configured to flow in a second direction different from the first direction.

Yet another embodiment of the present invention provides a method of configuring a network comprising one or more bridge devices and configured as a spanning tree having a root bridge device and an alternate port associated with the root bridge device and recovering from a communications link failure in the network. The method generally includes transmitting a first level of bridge communication configured to flow from the alternate port or a root port on each of the one or more bridge devices to a designated port on a coupled bridge device to automatically identify a ring associated with the root bridge device; generating at least one message notifying the one or more bridge devices where the alternate port resides in the event of the link failure; sending the at least one message to a bridge device having the alternate port capable of restoring connectivity to the root bridge device; and unblocking the alternate port based on the at least one message.

Yet another embodiment of the present invention provides a network bridge device supporting an alternate spanning tree protocol. The network bridge device generally includes hardware configured to send and receive a first and second level of bridge protocol data units (BPDUs) traveling in opposite directions and memory configured to store a message based on a location of an alternate port.

Yet another embodiment of the present invention provides a network bridge device supporting an alternate spanning tree protocol. The network bridge device generally includes means for automatically identifying a ring containing a root bridge device and an associated alternate port capable of restoring connectivity should a link failure occur; means for notifying the one or more bridge devices within the ring of the alternate port; means for sending a pre-computed message to a bridge device having the alternate port; and means for unblocking the alternate port based on the message.

Yet another embodiment of the present invention provides a system for network communication. The system generally includes at least two network bridge devices supporting an alternate spanning tree protocol, wherein each network bridge device comprises hardware configured to send and receive a first and second level of bridge protocol data units (BPDUs) traveling in opposite directions and memory configured to store a message based on a location of an alternate port learned from the first or second level of BPDUs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide methods that may form the basis of an alternate spanning tree protocol that may be used, for example, to identify rings within a properly converged network configured by the spanning tree protocol (STP) or rapid spanning tree protocol (RSTP). With the knowledge of these rings, the alternate spanning tree has predetermined an alternate port that can restore connectivity without further computation in case of a link failure, thereby providing for extremely fast reconvergence.

The alternate spanning tree is a protocol that helps the spanning tree identify the ring and advertise its existence. When a failure occurs, any bridge in the ring is immediately aware that a backup is available and which new STP state it is in: the failure for each segment in the ring has been precomputed. As a result of the alternate spanning tree operation, a failure notification can be sent and hardware switched around the ring, providing an acceptable reconvergence time. The alternate spanning tree may accomplish this by generating some specific BPDUs that advertise secondary routes to the root on blocked ports and root ports.

Although embodiments of the invention could apply to any network topology, proportionally larger benefits in the form of minimized reconvergence time may be seen with larger ring topologies.

An Exemplary Ring Topology

FIGS. 2A-2D and 3A-3D illustrate an exemplary ring topology, in which embodiments of the present invention may be used to advantage. Such a ring topology is commonly used by Internet service providers (ISPs) since it is typically the most economical method to connect several bridges over long distances and still provide redundancy. As will be described herein, network devices, such as bridges 202, may be configured to perform operations in accordance with an alternate spanning tree protocol, such as the operations show in the flow diagrams of FIGS. 4 and 5, to reduce network convergence time and re-establish connectivity in the event of a link failure.

Figure 2A:
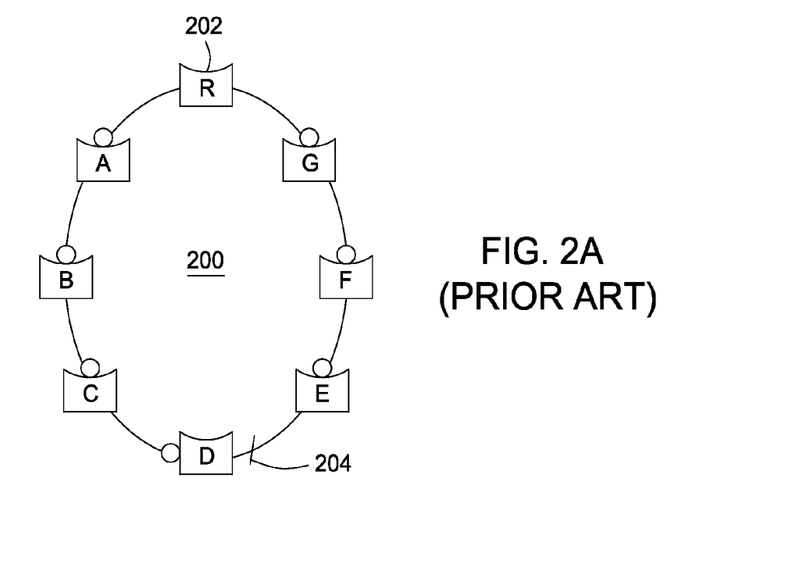
FIGS. 2A-D are prior art block diagrams of a ring topology of network bridges illustrating what occurs during link failure and recovery according to Rapid Spanning Tree Protocol (RSTP)

Operation of the ring topology will first be described, with reference to FIGS. 2A-2D, in accordance with conventional spanning tree protocol. As illustrated in FIG. 2A, the "healthy" ring 200 (no failure) with eight bridges has a root bridge (R) 202 and a blocked, alternate port 204 on bridge D, essentially providing two separate branches in the spanning tree. Having already been configured in accordance with a conventional spanning tree algorithm, designated and root port roles have already been assigned.

Figure 2B:
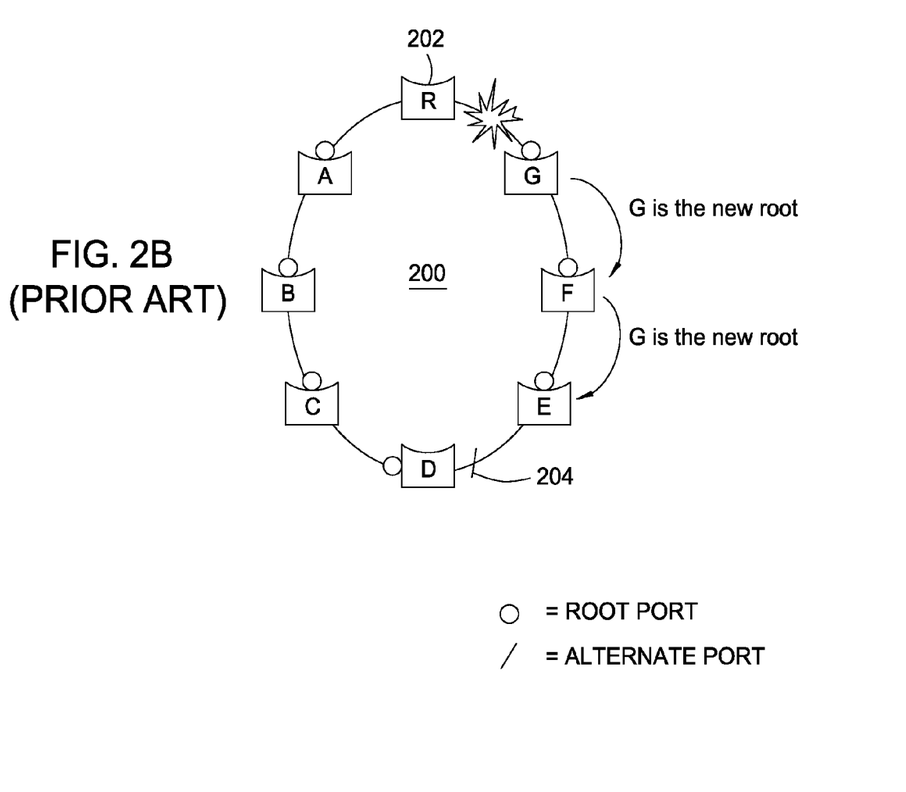

In FIG. 2B, a link failure occurs between the root bridge 202 and bridge G. The first phase of recovery consists of notifying bridge D holding the blocked port. When bridge G detects the failure of its link to the root bridge 202, it immediately pretends to be the root of the network and sends a corresponding BPDU to bridge F. Bridge F only knew about the root bridge 202 through bridge G. Hence, if bridge G pretends to be the root, then bridge F has no other choice than believing it according to the priority number ranking information contained within the BPDUs. The information that bridge G is the root is propagated in software, hopping from one bridge to the next, until it reaches bridge D, the first bridge that has an alternate path to the true root.

Figure 2C:
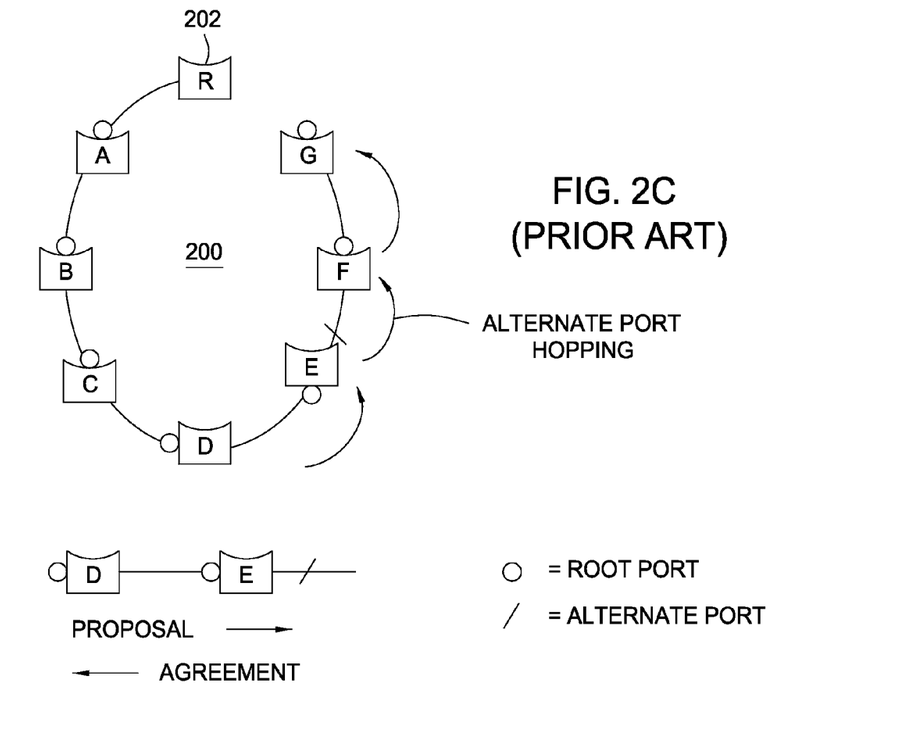

During the second phase of reconvergence, the spanning tree is going to move the blocked port on D to the location of the failure on bridge G, as illustrated in FIG. 2C. When bridge D has been notified that bridge E has lost its connection to the root bridge 202, bridge D turns its alternate port into a designated discarding port.

Figure 2D:
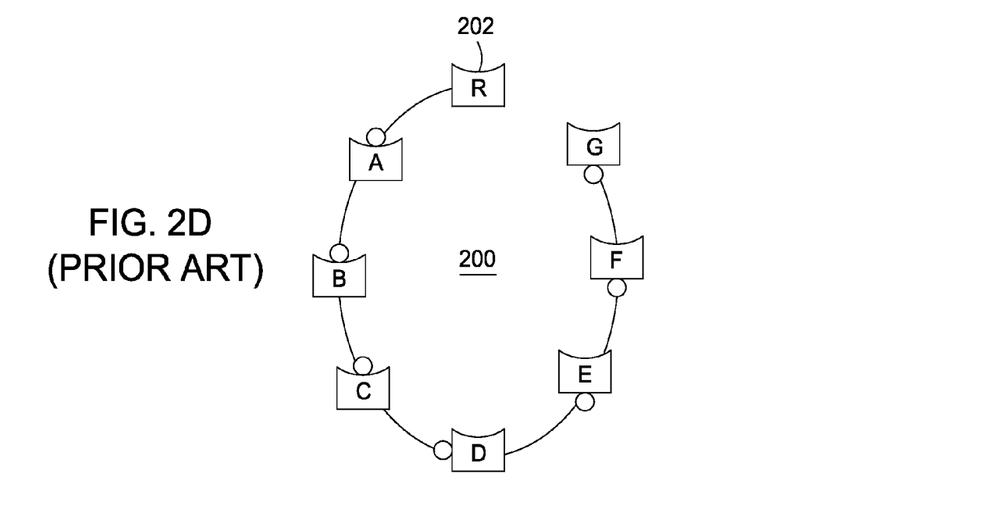

Bridge D then sends a proposal to bridge E through its designated discarding port. Since bridge E receives a better BPDU from bridge D than the BPDU coming from bridge F, bridge E changes the role of its port connected to bridge D to become a root port. Simultaneously, bridge E's port linked to bridge F becomes designated discarding. Bridge E then sends an agreement to bridge D that unblocks its designated discarding port. Bridge E then proposes to bridge F, and the process continues down the branch towards the failure. When bridge F eventually proposes to bridge G, bridge G can immediately return an agreement, and the reconvergence is completed as shown in FIG. 2D.

After completion, the ring 200 has become a unidirectional chain without a blocked port, but the network remains functional with every bridge having connectivity to the root bridge 202 through a unique root port. However, the software BPDU relaying process of hopping from one bridge to the next incurs an RSTP reconvergence time that includes the link failure detection time for the topology and three times the scheduling time plus the state change time for each of the bridges involved. Typically, this reconvergence time for RSTP is on the order of seconds and, thus, takes too long to satisfy the 50 ms reconvergence time required by ISPs. Although speeding up RSTP operations is not impossible, it would involve numerous infrastructure changes to both hardware and software that render it unlikely in the near future. Furthermore, this performance issue is particularly visible in topologies, such as the ring topology of the example, where the alternate port is far away from the location of a potential link failure it is backing up.

An Alternate Spanning Tree Protocol

As described above, each alternate port in a bridged network provides an alternate path to a root bridge in addition to the primary path provided by a root port. This assumes, of course, that the alternate port is appropriately blocked because of a redundant link forming a loop. With such an alternative path, if traffic was sent through a discarding alternate port of a particular network bridge, the traffic would eventually return to the same bridge through the bridge's root port. Therefore, a ring may be defined as the path traffic would take in flowing from an alternate port of a bridge to its root port, according to embodiments of the invention.

If a link fails within such a ring, connectivity may be restored by unblocking the alternate port associated with the ring. Therefore, if all of the bridges within the ring could possess the knowledge of which alternate port is backing up their links, they may be able to quickly recover from a link failure on the ring by simply unblocking the alternate port corresponding to the failed link.

To notify all of the bridges within the ring of the alternate port, one embodiment of the alternate spanning tree protocol may utilize another level of bridge protocol data units (BPDUs) that flow opposite to the normal direction, normal being from designated port to root port. Instead of flowing in the normal direction, these additional upstream, alternate BPDUs should travel from an alternate or root port to the designated port. These alternate BPDUs may be propagated according to a set of rules.

The first rule may be that from each alternate port, information received on the root port should be sent to other bridges. The second rule may be that from each root port, the best information (i.e. BPDUs with the lowest priority number) received on the alternate ports, if any, or the designated ports should be sent to other bridges connected to the root port. This additional upstream flow of BPDUs may identify exactly to which ring each network segment belongs in an effort to enable the bridges to predict what would be their next root port in case of a link failure.

Figure 4:
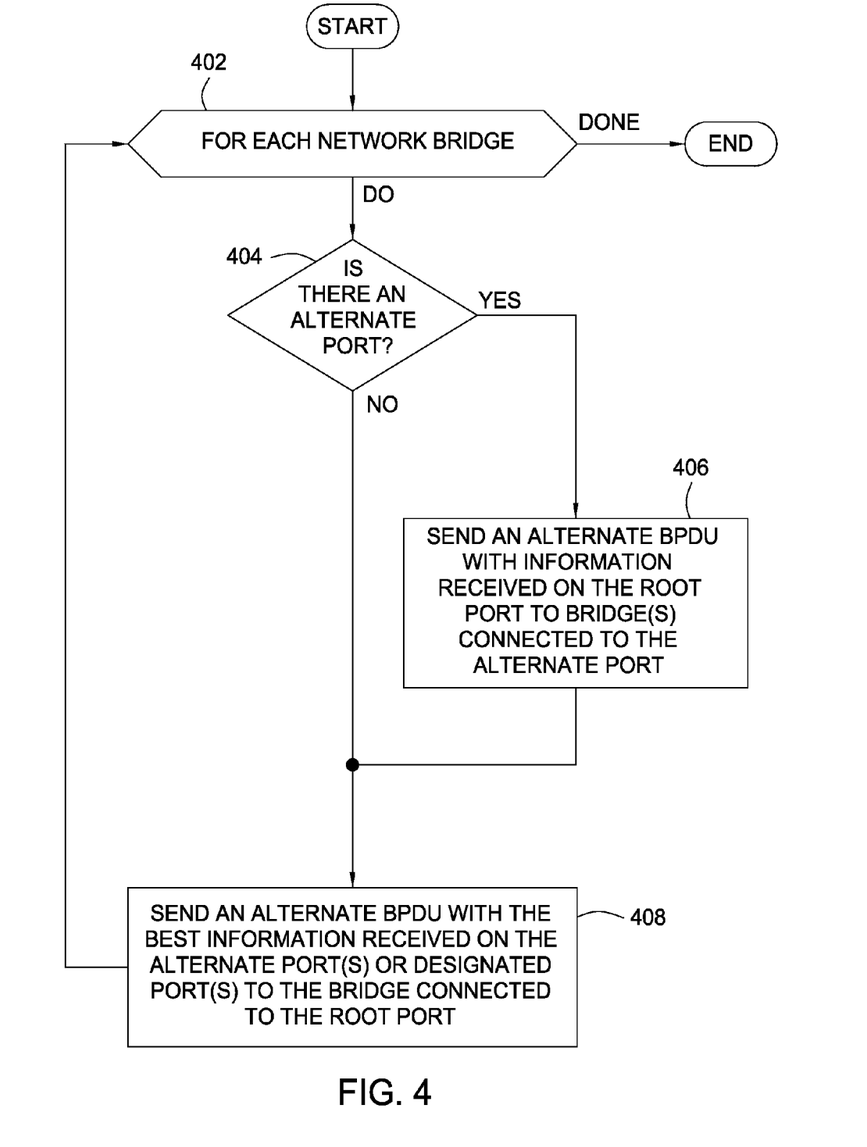
FIG. 4 is a flowchart portraying the method of alternate spanning tree protocol ring identification and broadcasting according to embodiments of the invention.

FIG. 4 illustrates exemplary operations for identifying rings in accordance with embodiments of the present invention. The operations of FIG. 4 may be performed as a preliminary step (e.g., whenever there is a change in network topology, such as a bridge added to the ring) to pre-compute alternate paths. Pre-computing alternate paths in this manner may allow for fast failure recovery by avoiding the need for computations later in order to restore connectivity in the event of a link failure.

As illustrated for each network bridge, a loop of operations is entered, at step 402, to determine if there is an alternate port, at step 404. If the network bridge has an alternate port, at step 406, an alternate BPDU with information received on the root port is sent to bridges connected to the alternate port. At step 408, an alternate BPDU with the best information received on the alternate port(s) or designated port(s) is sent to the bridge connected to the root port. Once the operations have been repeated (at each bridge), the rings should be identified.

Figure 3A:
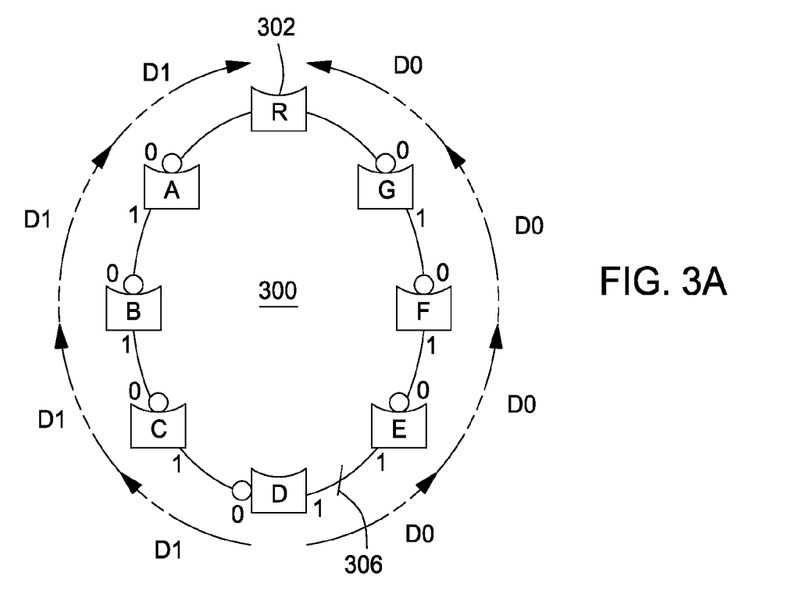
FIGS. 3A-D are block diagrams of the same ring topology of FIGS. 2A-D illustrating what occurs during link failure and recovery according to an alternate spanning tree protocol, according to embodiments of the invention.

Referring now to FIG. 3A, a block diagram of a ring topology whose single ring 300 may have already been identified, for example, in accordance with the operations described above is shown. Since the network may have previously been configured according to STP or RSTP, a root bridge 302 may have already been elected, and an alternate port 306 may exist at bridge D port 1. Furthermore, designated and root port roles may have already been assigned as shown.

According to the first rule for identifying the ring 300 with alternate BPDUs, bridge D should receive information on its root port (port 0) and transmit this on its alternate port 306 (port 1). This alternate BPDU labeled D0 should travel from the alternate port to the root bridge 302 in this example.

According to the second rule of alternate BPDUs, bridge D should receive information on its alternate port (port 1) and transmit this on its root port (port 0). In this example, this alternate BPDU labeled D1 should travel from the root port on bridge D to the root bridge 302. Both of these alternate BPDUs D0 and D1 may travel all the way to the root bridge 302 in this example since none of the network bridges have more than two ports. If a network bridge has more than two ports, the alternate BPDU that is transmitted may depend on the best (i.e. the lowest priority number) alternate BPDU received.

Of course, automatic identification of complete rings and the transmission of correct alternate BPDUs may depend on the network being completely healthy during alternate spanning tree ring identification. For instance, if a link has failed or a redundant link has not been connected during alternate spanning tree ring identification, then the alternate spanning tree may not work properly. When this happens, the network should return to a conventional RSTP or STP convergence.

Failure Recovery with Alternate Spanning Tree Protocol

Figure 3B:
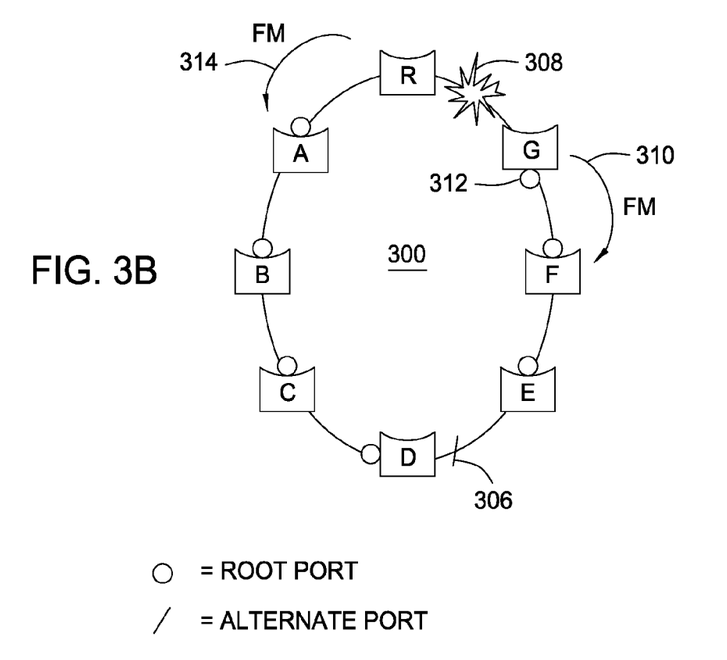

Referring to FIG. 3B, a link failure 308 between the root bridge 302 and bridge G is illustrated. Such a link failure could happen between any two bridges of the ring 300. For the purposes of discussion, only a link failure between the root bridge 302 and bridge G will be described herein as the worst case for recovery time. However, the process for failure recovery should follow the same basic operations regardless of where the failure occurs.

Figure 5:
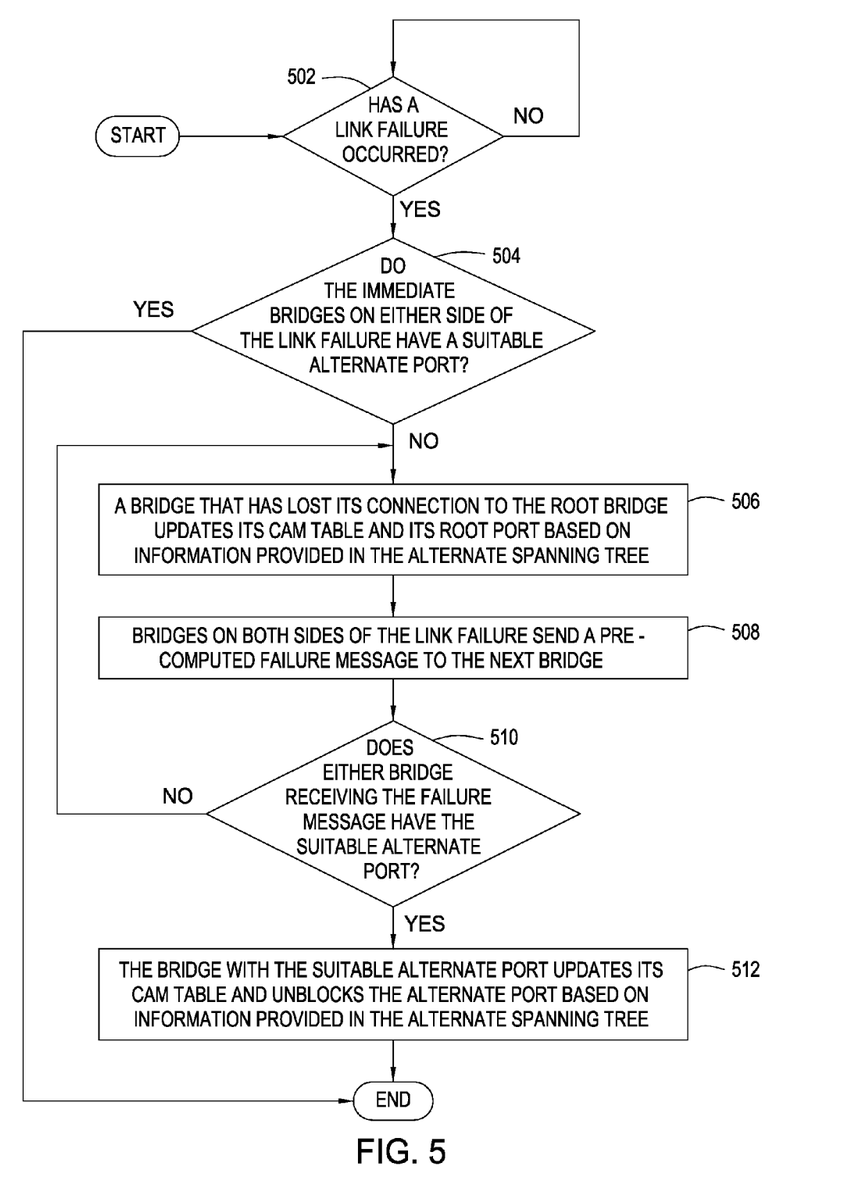
FIG. 5 is a flowchart delineating the method of alternate spanning tree protocol link failure recovery for a ring according to embodiments of the invention.

Exemplary operations for failure recovery in accordance with the alternate spanning tree protocol are shown in the flow diagram of FIG. 5. When the link fails, as determined in step 502, both network bridges involved may detect the failure. In the example illustrated in FIG. 3B, both the root bridge 302 and bridge G may sense the link failure. According to the alternate spanning tree protocol, bridge G should know which ring it belongs to and which alternate port of the ring 300 to unblock.

If the link failure 308 occurs in between two bridges of any ring with an alternate port, as determined at step 504, no action is required since full connectivity to the root bridge 302 has been maintained. Otherwise, a predetermined failure message 310 may be immediately sent from bridge G and forwarded in hardware in step 508. The failure message 310 may advertise a suitable alternate port (in this case, the alternate port 306) to unblock. This failure message 310 may originate from a central processing unit (CPU) of bridge G, whereby the CPU may clear the Content-Addressable Memory (CAM) table of the ports associated with bridge G, at step 506. Bridge G may also update one of its ports on the ring 300 to be its new root port 312 based on the information provided by the alternate spanning tree with its upstream BPDUs.

A second failure message 314 with similar content to the aforementioned failure message 310 may also be propagated in the opposite direction from the link failure 308 in step 508. Whichever failure message 310, 314 reaches the bridge with the alternate port in the ring 300 first may be the one delivering its content. For the example, the first failure message 310 should reach bridge D with the alternate port 306 first, so only the first failure message 310 will be considered henceforth.

In the illustrated example, after the failure message 310 is sent from bridge G in step 508, it may be received by the next bridge in the ring 300, bridge F. In response to this failure message 310, bridge F may then flush both its ports by clearing the CAM table, and change one of its ports on the ring 300 to be its new root port 316 repeating steps 506. Bridge F also may send the failure message 310 on to the next bridge in the ring 300 repeating step 508.

Figure 3C:
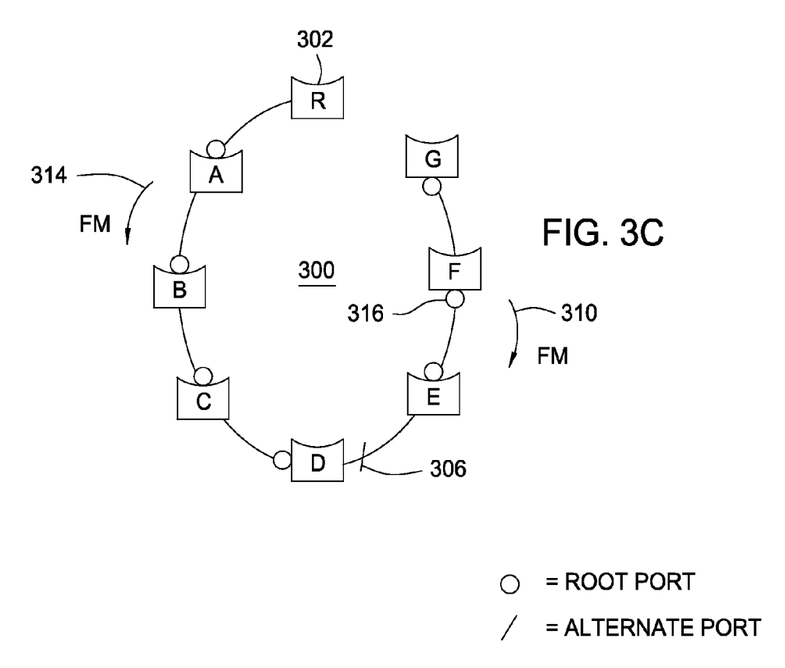

This process may continue, as illustrated in FIG. 3C, until the failure message 310 reaches a bridge with the alternate port 306 (bridge D in the illustrated example), as determined at step 510. At step 512, the bridge with the alternate port (bridge D) may flush its CAM tables, and it may subsequently unblock the alternate port 306. The network recovery from the link failure 308 may now be considered complete, as illustrated in FIG. 3D.

Figure 6:
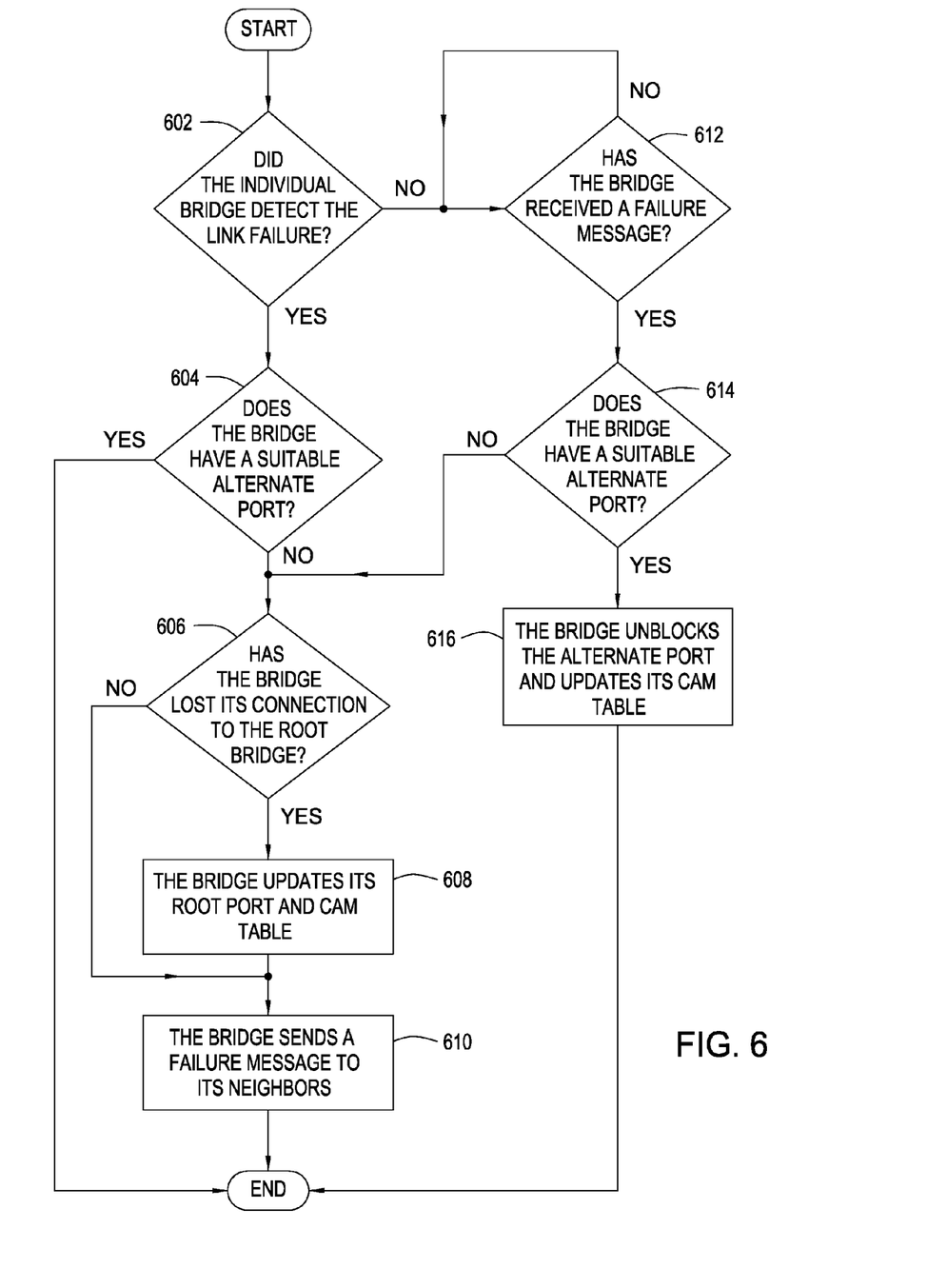
FIG. 6 is a flowchart illustrating the method of alternate spanning tree protocol link failure recovery from the perspective of an individual network bridge in a ring according to embodiments of the invention.

Another way to view recovery from a link failure according to embodiments of the invention with the alternate spanning tree protocol may be from the perspective of an individual bridge in a network after a link failure has occurred as illustrated in FIG. 6. The individual network bridge may know whether it detected the link failure and may decide which action to take in step 602. In step 604, if the individual bridge detected the link failure and has a suitable alternate port, then there should be nothing to do since connectivity to the root bridge 302 has been maintained. On the other hand, if the individual bridge does not have a suitable alternate port to restore connectivity to the root bridge 302 and detected the link failure, then it may send a failure message to its neighbors in step 610. If such a bridge has lost its connection to the root bridge 302 in step 606, it may also flush its ports by clearing its CAM table and change one of its ports to be its new root port in step 608.

If this individual network bridge did not detect the link failure, then it may wait to receive a failure message from one of its neighbors in step 612. Once it has received this failure message, the individual bridge may flush its CAM table and subsequently unblock its alternate port in step 616 if it possesses a suitable alternate port advertised in the failure message that should restore connectivity to the root bridge from step 614. Again, if the individual bridge does not have a suitable alternate port in step 614, then it may send a failure message to its neighbors in step 610. If such a bridge has lost its connection to the root bridge 302 in step 606, it may also flush its ports by clearing its CAM table and may change one of its ports to be its new root port in step 608.

Figure 3D:
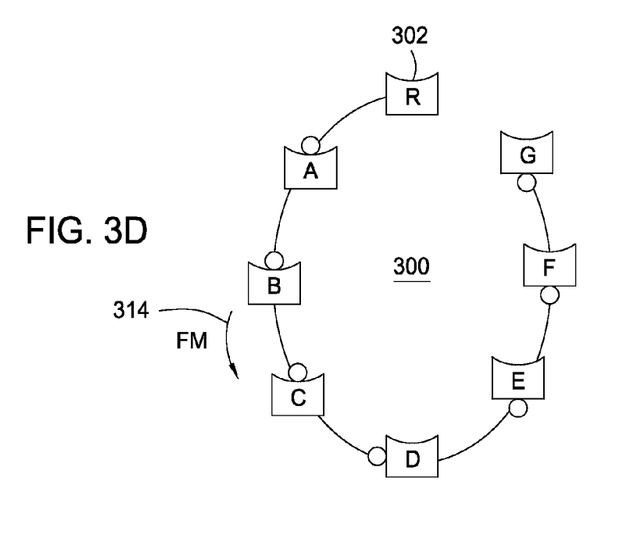

To review the alternate spanning tree algorithm, what was once a network ring 300 with a redundant link, as shown in FIG. 3A, may become a unidirectional network chain due to the link failure 308 and subsequent recovery, ultimately shown in FIG. 3D. While this end result is similar to that shown in FIG. 2D, achieved by utilizing a conventional spanning tree algorithm, the means and speed for reconvergence will likely be noticeably different. Of course, if a link failure had occurred elsewhere in the ring 300, reconvergence would lead to different end results, but the recovery speed should still be faster than that achieved with conventional RSTP or STP.

As mentioned above, if a link has failed or a redundant link has not been connected during alternate spanning tree ring identification, then the alternate spanning tree may not be configured properly. In addition, an original or newly added network bridge that does not support the alternate spanning tree protocol according to embodiments of the invention may prevent alternate spanning tree ring identification on any rings to which it belongs. In any of these cases, the network should return to a conventional RSTP or STP convergence, at least for such rings.

While the foregoing is directed to embodiments of the present invention, other and further embodiments of the invention may be devised without departing from the basic scope thereof, and the scope thereof is determined by the claims that follow.

The invention claimed is:

1. A method of recovering from a communications link failure in a network comprising one or more bridge devices and configured as a spanning tree having a root bridge device and an alternate port associated with the root bridge device and capable of restoring connectivity to the root bridge device after the communications link failure, the method comprising:
   automatically identifying a ring containing the root bridge device and the alternate port;
   notifying the one or more bridge devices within the ring of the alternate port;
   after the communications link failure occurs, sending a pre-computed message to a bridge device having the alternate port;
   unblocking the alternate port based on the message; and
   prior to unblocking the alternate port, reconfiguring a port on at least one of the bridge devices in the ring to be a new root port in response to the pre-computed message.

2. The method of claim 1, wherein reconfiguring the port comprises clearing a Content-Addressable Memory (CAM) table.

3. The method of claim 1, wherein notifying the one or more bridge devices within the ring of the alternate port comprises transmitting alternate bridge protocol data units (BPDUs) from the alternate port or a root port of a first bridge device to a designated port of a second bridge device.

4. The method of claim 1, wherein automatically identifying a ring containing the root bridge device and the alternate port comprises:
   sending information received on a root port of a bridge device having the alternate port from the alternate port of said bridge device to another bridge device coupled to the alternate port; and
   sending information with a lowest priority number received on the alternate port or at least one designated port from a root port of the one or more bridge devices to a bridge device coupled to the root port.

5. A method of configuring a network comprising one or more bridge devices, the method comprising:
   providing a first type of bridge communication flowing in a first direction;
   selecting a root bridge device based on information contained in the first type of bridge communication;
   during a configuration of the network and prior to a communications link failure, automatically providing a second type of bridge communication flowing in a second direction different from the first direction, wherein the second direction is from an alternate port or a root port of a first one of the bridge devices to a designated port of a second one of the bridge devices;
   storing information for a failure message in memory of the first and second bridge devices based on information contained in the second type of bridge communications;
   after the communications link failure, sending the failure message to a bridge device having the alternate port;
   unblocking the alternate port based on the failure message; and
   prior to unblocking the alternate port, reconfiguring a port on at least one of the one or more bridge devices to be a new root port in response to the failure message.

6. The method of claim 5, wherein the first type of bridge communication comprises bridge protocol data units (BPDUs).

7. The method of claim 6, wherein the second type of bridge communication comprises alternate BPDUs advertising a secondary route to the root bridge device.

8. The method of claim 5, wherein the first direction is from the designated port of the second one of the bridge devices to the root port of the first one of the bridge devices.

9. The method of claim 5, wherein the failure message designates an alternate port of one of the bridge devices to unblock.

10. A method of configuring a network comprising one or more bridge devices and configured as a spanning tree having a root bridge device and an alternate port associated with the root bridge device and recovering from a communications link failure in the network, the method comprising:
    transmitting a first type of bridge communication flowing from the alternate port or a root port on each of the one or more bridge devices to a designated port on a coupled bridge device to automatically identify a ring associated with the root bridge device;
    after the communications link failure, sending at least one message to a bridge device having the alternate port capable of restoring connectivity to the root bridge device;
    unblocking the alternate port based on the at least one message; and
    prior to unblocking the alternate port, updating a port on at least one of the bridge devices that lost connectivity to the root bridge device due to the link failure to be a new root port.

11. The method of claim 10, further comprising transmitting a second type of bridge communication flowing from the designated port on each of the one or more bridge devices to the root port on the coupled bridge device.

12. The method of claim 10, wherein updating the port comprises clearing a Content-Addressable Memory (CAM) table on each of the one or more bridge devices that lost connectivity to the root bridge device.

13. A network bridge device supporting an alternate spanning tree protocol, comprising:
   hardware configured to send and receive a first and a second type of bridge protocol data units (BPDUs) traveling in opposite directions during a configuration of a network, wherein the second type of BPDUs travels from a root port of the network bridge device to a designated port of another network bridge device; and
   memory configured to store a message based on a location of the alternate port in the network, wherein the hardware is further configured to detect a communications link failure or receive a failure message, to update, prior to unblocking an alternate port on a separate network bridge device, a port of the network bridge device to be a new root port in response to detecting the communications link failure or receiving the failure message, and to transmit the stored message or the received failure message, respectively.

14. The network bridge device of claim 13, wherein the location of the alternate port is learned from the second type of BPDUs.

15. The network bridge device of claim 13, wherein the hardware is further configured to unblock the alternate port upon detecting the communications link failure or receiving the failure message.

16. The network bridge device of claim 13, wherein the hardware is configured to update the port to be the new root port by clearing a Content-Addressable Memory (CAM) table.

17. A system for network communication, comprising:
   at least two network bridge devices supporting an alternate spanning tree protocol, each network bridge device comprising:
      hardware configured to send and receive a first and a second type of bridge protocol data units (BPDUs) traveling in opposite directions during a configuration of the system, wherein the second type of BPDUs travels from a root port of the network bridge device to a designated port of another network bridge device; and
      memory configured to store a message based on a location of the alternate port in the system learned from the second type of BPDUs, wherein the hardware is further configured to detect a communications link failure in the system or receive a failure message, to update, prior to unblocking an alternate port on a separate network bridge device, a port of the network bridge device to be a new root port in response to detecting the communications link failure or receiving the failure message, and to transmit the stored message or the received failure message, respectively.

18. A network bridge device supporting an alternate spanning tree protocol, comprising:
   means for sending and receiving a first and a second type of bridge protocol data units (BPDUs) traveling in opposite directions during a configuration of a network, wherein the second type of BPDUs travels from a root port of the network bridge device to a designated port of another network bridge device;
   means for storing a message based on a location of the alternate port in the network;
   means for detecting a communications link failure or receiving a failure message;
   means for updating, prior to unblocking an alternate port on a separate network bridge device, a port of the network bridge device to be a new root port in response to detecting the communications link failure or receiving the failure message; and
   means for transmitting the stored message or the received failure message, respectively.

19. The network bridge device of claim 18, wherein the means for updating the port is configured to update the port to be the new root port by clearing a Content-Addressable Memory (CAM) table.

* * * * *